United States Patent
Lin

(10) Patent No.: US 8,687,913 B2
(45) Date of Patent: Apr. 1, 2014

(54) METHODS AND APPARATUS FOR IMAGE DEBLURRING AND SHARPENING USING LOCAL PATCH SELF-SIMILARITY

(75) Inventor: Zhe Lin, Fremont, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/551,439

(22) Filed: Jul. 17, 2012

(65) Prior Publication Data

US 2014/0023291 A1 Jan. 23, 2014

(51) Int. Cl.
*G06K 9/40* (2006.01)

(52) U.S. Cl.
USPC .............. 382/263; 382/264; 382/279

(58) Field of Classification Search
USPC ......... 382/167, 263, 264, 275, 279, 260, 261; 28/260; 375/E7.167; 348/241, 242, 348/273, 208.6, E9.01
See application file for complete search history.

(56) References Cited

U.S. PATENT DOCUMENTS

| 5,909,516 | A * | 6/1999 | Lubin ........................ 382/260 |
| 6,404,918 | B1 * | 6/2002 | Hel-or et al. ............... 382/167 |
| 6,618,503 | B2 * | 9/2003 | Hel-or et al. ............... 382/167 |

OTHER PUBLICATIONS

Sunghyun Cho and Seungyong Lee. Fast motion deblurring. ACM Trans. Graphics, 28(5):145:1-145:8, 2009.
R. Fergus, B. Singh, A. Hertzmann, S. T. Roweis, and W. T. Freeman. Removing camera shake from a single photograph. ACM Trans. Graphics, 25(3):787-794, 2006.
Neel Joshi, Richard Szeliski, and David Kreigman. PSF estimation using sharp edge prediction. In Proc. CVPR 2008, pp. 1-8, 2008.
Anat Levin, Rob Fergus, Fredo Durand, and William T. Freeman. Image and depth from a conventional camera with a coded aperture. ACM Trans. Graphics, 26(3):70:1-70:9, 2007.
Anat Levin, Yair Weiss, Bill Freeman, and Fredo Durand. Efficient approximations to the marginal likelihood in blind deconvolution. In Proc. CVPR 2011, 2011. pp. 1-14.
Qi Shan, Jiaya Jia, and Aseem Agarwala. High-quality motion deblurring from a single image. ACM Trans. Graphics, 27(3):73:1-73:10,2008.
Jian Sun, Jian Sun, Zongben Xu, and Heung-Yeung Shum. Image super-resolution using gradient profile prior. In Proc. CVPR 2008, pp. 1-8,2008.
Li Xu and Jiaya Jia. Two-phase kernel estimation for robust motion deblurring. In Proc. ECCV 2010, pp. 157-170, 2010. Aug. 24, 2012.
Yilun Wang, Junfeng Yang, Wotao Yin, and Yin Zhang. A new alternating minimization algorithm for total variation image reconstruction. Siam J. Imaging Sci, pp. 248-272, 2008.

\* cited by examiner

*Primary Examiner* — Anh Do
(74) *Attorney, Agent, or Firm* — Wolfe-SBMC

(57) ABSTRACT

Various embodiments of methods and apparatus for image deblurring and sharpening using local patch self-similarity are disclosed. In some embodiments, an input blurred image is down-sampled to generate a downsized image. The downsized image is convolved with a blur kernel to obtain a smoothed image. For each of a plurality of patches of the input blurred image, a corresponding patch in the smoothed image is found. High frequency components between each of the plurality of corresponding patches in the smoothed image and corresponding patches of the downsized image are computed. The high frequency components are applied to the plurality of patches of the input blurred images to generate a deblurred version of the input blurred image.

20 Claims, 12 Drawing Sheets

METHODS AND APPARATUS FOR IMAGE DEBLURRING AND SHARPENING USING LOCAL PATCH SELF-SIMILARITY

BACKGROUND

Description of the Related Art

An increase in market penetration of mobile devices and tablets equipped with internal cameras has accelerated the production of many low-quality photographs with defects resulting from low-cost, small aperture lenses common in mobile devices and tablets. The images produced by mobile devices are often noisy and blurry due to their camera sensor limitation and hand-held nature.

This profusion of low-quality photographs has made improvement in basic image restoration tasks, such as image deblurring, sharpening, and denoising, substantially potentially valuable for users of graphics software. More specifically, image deblurring and sharpening is a long-standing, fundamental problem in digital image restoration, referred to as "a field of engineering that studies methods used to recover an original scene from degraded observations". Image blurs can be divided into two categories: defocus blur and motion blur, and motion blur can be caused by either/both camera shake and/or independent moving objects, e.g. people.

Image deblurring is a long-studied problem in image processing and computer vision, but adequate solutions have evaded researchers and developers due to complexity of blur patterns in the image, image noise and non-uniformity of blur kernels in images. Most previously-existing approaches to non-blind deconvolution are either too slow, too sensitive to noise, or prone to ringing artifacts near edges due to loss of information by the underlying blurring process. Often, previously-existing approaches generate artifacts resulting from deconvolution, and/or remove the amplification effects of noise with a post-processing method. More importantly, when blur kernels are not spatially piece-wise constant, the small spatial difference of kernels cause significant artifacts in performing deconvolution.

SUMMARY

Various embodiments of methods and apparatus for image deblurring and sharpening using local patch self-similarity are disclosed. In some embodiments, an input blurred image is down-sampled to generate a downsized image. The downsized image is convolved with a blur kernel to obtain a smoothed image. For each of a plurality of patches of the input blurred image, a corresponding patch in the smoothed image is found. High frequency components, which are sometimes described as frequency band differences, between each of the plurality of corresponding patches in the smoothed image and corresponding patches of the downsized image are computed. The high frequency components are applied to the plurality of patches of the input blurred images to generate a deblurred version of the input blurred image.

Figure 1:
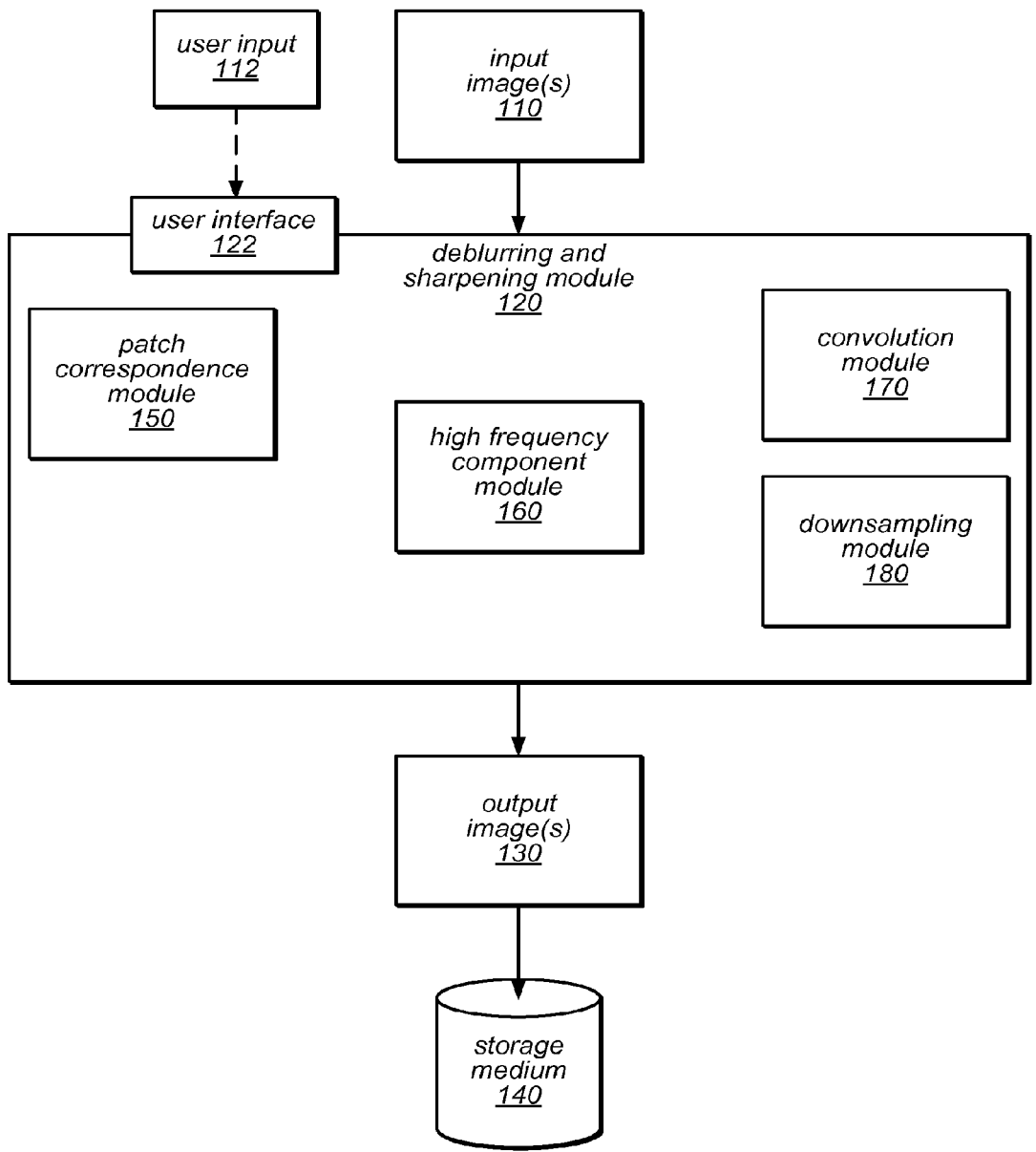
FIG. 1 illustrates a module that may implement image deblurring and sharpening using local patch self-similarity, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. One of skill in the art will additionally realize that functions described herein in a particular order or as residing within particular modules may exist in other modules or be executed in an order other than that listed, and that additional or fewer modules and functions may be used without departing from the scope and intent of the present disclosure.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for image deblurring and sharpening using local patch self-similarity are disclosed. In some embodiments, one or more processors perform down-sampling an input blurred image to generate a downsized image. In some embodiments, down-sampling of an image is the elimination of image frequencies higher than half the sampling frequency in the result image, which is called a smoothed image. As an example, an image can be downsampled to reduce sharp features in the image. Another example of downsampling is the use of downsampling to decrease the size of an image. Frequencies thus eliminated are called high-frequency components. Some embodiments further perform convolving the downsized image with a blur kernel to obtain a smoothed image. In some embodiments, blur kernel is a mathematical representation used in the blurring of an image or representing the blurring that occurred in an image. Turning briefly to FIG. 9B, an example visual representation of a blur kernel 906 is shown at FIG. 9B. Convolution is the integral of the product of the two functions after one is reversed and shifted. The convolution of f and g is written f*g, using an asterisk or star. It is a particular kind of integral transform of the form:

$$(f * g)(t) \stackrel{def}{=} \int_{-\infty}^{\infty} f(\tau) g(t - \tau) d\tau.$$

For each of a plurality of patches of the input blurred image, some embodiments perform finding a corresponding patch in the smoothed image. Some embodiments perform computing high frequency components between each of the plurality of corresponding patches in the smoothed image and corresponding patches of the downsized image. Some embodiments perform applying the high frequency components to the plurality of patches of the input blurred images to generate a deblurred version of the input blurred image.

In some embodiments, the computing the high frequency components between each of the plurality of corresponding patches in the smoothed image and the corresponding patches of the downsized image further includes finding a near example patch in the smoothed image, extracting a corresponding patch for the near example from a corresponding location in the downsized image, computing the high frequency components subtracting the near example patch from the corresponding patch, and updating the source patch by adding the high frequency component. In some embodiments, the finding a near example patch in the smoothed image further comprises finding a nearest example patch in terms of a Euclidian distance around a mapping location.

In some embodiments, the computing high frequency components between each of the plurality of corresponding patches in the smoothed image and the corresponding patches of the downsized image further includes finding a plurality of near example patches in the smoothed image, extracting a plurality of corresponding patches for the plurality of near examples from a plurality of corresponding locations in the downsized image, computing (frequency band) difference between a plurality of near example patches and the plurality of corresponding patches, computing a denoised center pixel of a source patch from the plurality of example patches in the smoothed image, computing a denoised high frequency component by linearly combining the plurality of the high frequency components from corresponding patch pairs in the smoothed image and the downsized image, and updating a source patch by adding the denoised high frequency component.

In some embodiments the convolving the downsized image with the elementary blur kernel further includes convolving the downsized image with the elementary blur kernel with the size of the elementary blur kernel proportional to a scale factor. Some embodiments further convert the input blurred image from a color channel space to a luminance and chrominance space, and execute the generating, obtaining, computing and estimating with respect to a luminance channel of the luminance and chrominance space. In some embodiments, the generating, obtaining, computing and estimating are iterated with respect to the deblurred output. Some embodiments further perform estimating a number of iterations for the generating, obtaining, computing and estimating based on a standard deviation and mean of the Gaussian kernel of the blurred image.

In some embodiments, the generating a downsized image by down-sampling by a factor from an input blurred image further includes generating a downsized image by down-sampling by a factor an input blurred image through bi-cubic interpolation. In some embodiments, the blur kernel is an elementary blur kernel.

Introduction to Image Deblurring and Sharpening Using Local Patch Self-Similarity Some embodiments execute a local patch self similarity-based approach for image sharpening and deblurring, which recursively sharpens an input blurry image to obtain a sharp, deblurred result. Some embodiments are orders of magnitude faster than previously-existing blind/non-blind deconvolution algorithms. Experimental results show that some embodiments generate more natural, sharper, artifact-free results than the best available non-blind image deconvolution approach, and are significantly more robust to input image noise and spatial non-uniformity of the blur kernels. While some embodiments are directly applied to image super-resolution by deblurring the bicubic-interpolated upscaled images, embodiments are not so limited. In some embodiments, denoising and deblurring are handled simultaneously.

Some embodiments are designed to handle out-of-focus blur and small motion blur. The out-of-focus blur can be modeled by either a 2D circular-disk kernel or a 2D isotropic Gaussian kernel with zero-mean and 1D standard deviation $\phi$ (which can be approximated as recursive filtering of the image with an elementary 2D Gaussian kernel with a small $\sigma$), and the small motion blur can be modeled by either a 1D uniform kernel or 1D Gaussian kernel with zero-mean and standard deviation $\phi$ with a known direction (which can be modeled as a recursive filtering of the image with a directional 1D Gaussian kernel with a small $\sigma$). The number of iterations (filtering) N for the recursive filtering can be estimated as $N=\lfloor \phi^2/\sigma^2 \rfloor$, where $\lfloor x \rfloor$ computes the largest integer smaller than or equal to x.

Two example embodiments are presented below as Algorithms 1 & 2, and various embodiments are further described by FIGS. 1-5, which are discussed below. Note that, for a gray-scale image, some embodiments directly execute the algorithms discussed below; while for a color RGB image, for efficiency, some embodiments convert the input image to YCbCr space, and run the deblurring algorithm described below on the luminance channel Y only. Other embodiments independently deblur all three color channels, but the computation is 3-times slower and the resulting quality is similar to the former option.

Algorithm 1 Image Deblurring/Sharpening Algorithm with Patch Self-Similarity

Given an input blurry image I and assuming it has a roughly spatially uniform blur kernel K (with its corresponding elementary blur kernel denoted as k), embodiments
(0) initialize the blurry image: $Z \leftarrow I$.
for i=1: N
(1) down-sample it by a factor $\alpha$ through bicubic interpolation to obtain the downsized image $L_0$.
(2) convolve $L_0$ with the elementary blur kernel k (with its size/sigma proportional to the scale factor $\alpha$) to obtain the smoothed image $Z_0$. In one implementation, the parameters are set to $\sigma=0.55$, $\alpha=1.5$.
for each p×p patch $z_i$ at location (x, y) in Z,
(3-1) find its nearest example patch $z_0$ in terms of Euclidean distance at $Z_0$ in a very local neighborhood (dashed box) around the mapping location (x/$\alpha$, y/$\alpha$), and extract the corresponding patch $l_0$ in $L_0$ at the same spatial location.
(3-2) compute the high frequency component of the source patch $\Delta_0=(l_0-z_0)$, and form the high frequency image $\Delta$ by averaging the estimates over overlapping pixels between $\Delta_0$'s.
end for
(4) compute the estimate $\hat{L}$ of the unknown image L by frequency transfer: $\hat{L}=Z+\Delta$.
(5) re-initialize the blurry image.
end for
return $\hat{L}$ Some embodiments apply the above algorithm for clean input images. When there is significant noise in the input image, some embodiments apply a modification to the above algorithm by finding k nearest neighbors instead of the single nearest neighbor, and update the high frequency component by a weighted sum of the high frequency components from multiple example patches. Algorithm 2 describes an embodiment of an algorithm for simultaneous denoising and deblurring using k-nearest neighbor patches finding (the pixel intensity and any color channel value is normalized to a range of [0 1]). Note that, for a gray-scale image, some embodiments directly run the following algorithm; while for a color RGB image, for efficiency, some embodiments convert the input image to YCbCr space, and run the deblurring algorithm on the luminance channel Y only. Alternatively, some embodiments independently deblur all three color channels, but the computation is 3-times slower and the resulting quality is similar to the former option.

Algorithm 2 Simultaneous Image Deblurring/Sharpening and Denoising Algorithm with Patch Self-Similarity Given an input blurry image I and assuming it has a roughly spatially uniform blur kernel K (with its corresponding elementary blur kernel denoted as k), embodiments
(0) initialize the blurry image: $Z \leftarrow I$.
for i=1: N
(1) down-sample it by a factor $\alpha$ through bicubic interpolation to obtain the downsized image $L_0$.
(2) convolve $L_0$ with the elementary blur kernel k (with its size/sigma proportional to the scale factor $\alpha$) to obtain the smoothed image $Z_0$. In some implementations, the parameters are set to $\sigma=0.55$, $\alpha=1.5$.
for each p×p patch $z_i$ at location (x, y) in Z,
(3-1) find k nearest example patches $\{z_{0,k}\}_{k=1 \ldots K}$ in terms of Euclidean distance at $Z_0$ in a very local neighborhood (dashed box in FIG. 2) around the mapping location (x/$\alpha$, y/$\alpha$), and extract the corresponding patches $\{l_{0,k}\}_{k=1 \ldots K}$ in $L_0$ at the same spatial locations.
(3-2) compute the high frequency component $$\Delta_0 = \sum_k w_k (l_{0,k} - z_{0,k}),$$

where $w_k = \exp(-\beta \|z - z_{0,k}\|^2)/W$, the weight sum $$W = \sum_k \exp(-\beta \|z - z_{0,k}\|^2),$$

and the parameter $\beta=20$.
(3-3) compute the denoised center pixel of the source patch $$\bar{z}_i(p) = (1-\alpha) z_i(p) + \alpha \sum_k w_k z_{0,k}(p),$$

where p is the center pixel of the patch at i, $\alpha=W/(W+\delta)$, and $\delta$ is set to 10 in our implementation.
(3-4) form the high frequency image $\Delta$ by averaging the estimates over overlapping pixels between $\Delta_0$'s, and form the denoised source image $\bar{Z}$ from $\bar{z}_i(p)$.
end for
(4) compute the estimate $\hat{L}$ of the unknown image L by frequency transfer: $\hat{L}=\bar{Z}+\Delta$.
(5) re-initialize the blurry image.
end for
return $\hat{L}$ In some embodiments, the above algorithm using patch self-similarity implicitly minimizes common data fidelity (data cost) in image deconvolution. The most common data fidelity term in image deconvolution is the reconstruction term $E(L)=\|Z-K \otimes L\|_2^2$, where Z is the blurry input image, L is the unknown latent image, K is the known blur kernel. Assuming the convolution with kernel K can be modeled as T convolution operations with its elementary kernel k, then the cost term can be rewritten as: $E(L)=\|Z-K \otimes L\|_2^2=\|Z-k \otimes k \otimes \ldots k \otimes L\|_2^2=\|Z-k \otimes L_1\|_2^2$, where $L_1$ is obtained by successively convolving L with k for (T−1) times. Some embodiments generate estimates of $L_1$ that minimize the cost, as can be shown by decomposing the cost term in terms of sum over all patches i and substituting a patch estimate $\hat{l}_i$ reflected in some embodiments. For simplicity, the discussion below only shows discussion for the case of Algorithm 1, while a similar derivation can be done for Algorithm 2.

$$\|Z-k \otimes L_1\|_2^2 = \sum_{i \in P} \|z_i - (k \otimes l)_i\|_2^2 = \sum_{i \in P} \|z_i - k \otimes l_i\|_2^2 =$$

$$\sum_{i \in P} \|z_i - k \otimes (z_i + (l_0 - z_0))\|_2^2 = \sum_{i \in P} \|z_i - z_0 - k \otimes (z_i - z_0)\|_2^2$$

As can be seen from the above equation, since $z_0$ is the nearest neighbor patch for $z_i$, such that $z_0 \approx z_i$. Consequently the cost term approaches zero. In other words, some embodiments implicitly minimize the data fidelity term through the nearest neighbor patch search and the frequency band transfer process.

Unlike alternative image deconvolution methods, in which there is also a prior term added to the data fidelity term, which encourages sparsity of gradient energy over the entire image or minimizes total variation, embodiments encourage the sparsity implicitly by bypassing the addition of higher frequency components on low-contrast, smooth regions, which also significantly accelerates the overall patch search process. The low contrast and smooth regions are identified by thresholding either variance of the patches or the distance to the nearest neighbor patches. Some embodiments also explicitly compute the full cost function (sum of data term and sparsity term) in each iteration to sparsify the Δ and then perform frequency band transfer in Algorithm 1 and 2, but such calculation is much slower than other embodiments Some embodiments may include a means for performing image deblurring and sharpening using local patch self-similarity. For example, a deblurring and sharpening module may receive input identifying a digital image or a portion of a digital canvas on which deblurring and sharpening using local patch self-similarity is desired, and perform deblurring and sharpening using local patch self-similarity, as described herein. The deblurring and sharpening module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform deblurring and sharpening using local patch self-similarity, as described herein. Other embodiments of the non-uniform paint loading module may be at least partially implemented by hardware circuitry and/or firmware stored, for example, in a non-volatile memory.

Example Implementations

FIG. 1 illustrates a module that may implement image deblurring and sharpening using local patch self-similarity, according to some embodiments, including techniques and tools illustrated in FIGS. 2-5. Deblurring and sharpening module 120 may, for example, implement one or more of a deblurring and sharpening tool, a deblurring and sharpening brush tool, and a deblurring and sharpening spot healing tool, and a gesture-based painting tool. FIG. 10 illustrates an example computer system on which embodiments of deblurring and sharpening module 120 may be implemented. Deblurring and sharpening module 120 receives as input one or more digital input images 110. An example image is shown in FIG. 6A. Deblurring and sharpening module 120 may receive user input 112 activating a multitouch gesture-based image editing tool. Deblurring and sharpening module 120 then sharpens and deblurs the input image(s) 110, according to user input 112 received via user interface 122, using the deblurring and sharpening image editing tool. Deblurring and sharpening module 120 generates as output one or more modified images 130. Output image(s) 130 may, for example, be stored to a storage medium 140, such as system memory, a disk drive, DVD, CD, etc.

In some embodiments, deblurring and sharpening module 120 includes a patch correspondence module 150, which performs, for each of a plurality of patches of the input blurred image, finding a corresponding patch in the smoothed image. In some embodiments, deblurring and sharpening module 120 includes a high frequency component module 160, which performs computing high frequency components between each of the plurality of corresponding patches in the smoothed image and corresponding patches of the downsized image. In some embodiments, high frequency component module 160 also performs applying the high frequency components to the plurality of patches of the input blurred images to generate a deblurred version of the input blurred image. In some embodiments, deblurring and sharpening module 120 includes a convolution module 170, which performs convolving the downsized image with a blur kernel to obtain a smoothed image. In some embodiments, deblurring and sharpening module 120 includes a downsampling module 180, which performs perform down-sampling an input blurred image to generate a downsized image.

In some embodiments, high frequency component module 160 performs finding a near example patch in the smoothed image, extracting a corresponding patch for the near example from a corresponding location in the downsized image, computing a high frequency component for the near example patch and the corresponding patch, and updating the source patch by adding the high frequency component. In some embodiments, the finding a near example patch in the smoothed image further comprises finding a nearest example patch in terms of a Euclidian distance around a mapping location.

In some embodiments, high frequency component module 160 performs finding a plurality of near example patches in the smoothed image, extracting a plurality of corresponding patches for the plurality of near examples from a plurality of corresponding locations in the downsized image, computing (frequency band) differences between the plurality of near example patches and the plurality of corresponding patches, computing a denoised center pixel of a source patch from the plurality of example patches in the smoothed image, computing a denoised high frequency component by linearly combining the plurality of the high frequency components from corresponding patch pairs in the smoothed image and the downsized image, and updating a source patch by adding the denoised high frequency component.

In some embodiments convolution module 170 performs convolving the downsized image with the elementary blur kernel with the size of the elementary blur kernel proportional to a scale factor. Some embodiments of deblurring and sharpening module 120 convert the input blurred image from a color channel space to a luminance and chrominance space, and execute the generating, obtaining, computing and estimating with respect to a luminance channel of the luminance and chrominance space. In some embodiments, the generating, obtaining, computing and estimating are iterated by deblurring and sharpening module 120 with respect to the deblurred output. Some embodiments of deblurring and sharpening module 120 perform estimating a number of iterations for the generating, obtaining, computing and estimating based on a standard deviation and mean of the Gaussian kernel of the blurred image. In some embodiments, down-sampling module 180 performs generating a downsized image by down-sampling by a factor an input blurred image through bi-cubic interpolation. In some embodiments, the blur kernel is an elementary blur kernel.

In some embodiments, deblurring and sharpening module 120 may provide a user interface 122 via which a user may interact with deblurring and sharpening module 120, for example to activate a deblurring and sharpening image editing tool, to perform a selection gesture, and to perform a deblurring and sharpening method as described herein. In some embodiments, the user interface may provide user interface elements whereby the user may select options including, but not limited to, a number of iterations, options with impact on speed and/or accuracy, and selection of methods (e.g. single or multiple nearest neighbors).

Figure 2:
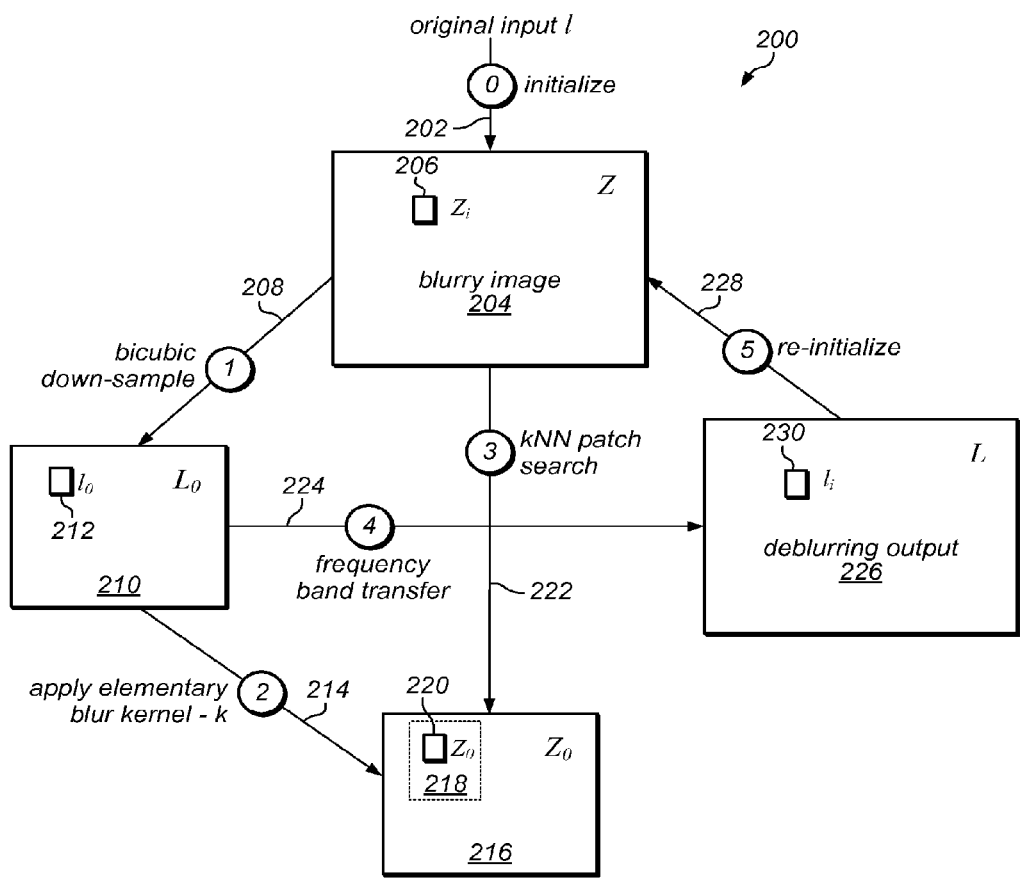
FIG. 2 is a high level process diagram for implementing image deblurring and sharpening using local patch self-similarity according to some embodiments.

FIG. 2 is a high level process diagram for implementing image deblurring and sharpening using local patch self-similarity according to some embodiments. Process 200 includes initialization 202 by receipt of a blurred input image 204 that may be represented as a set of patches, including patch $z_i$ 206. Bi-cubic down-sampling 208 is performed to generate a down-sampled image $L_0$ 210 in which a patch $l_0$ 212 corresponds to patch $z_i$ 206. Application of an elementary blur kernel 214 is performed to obtain a smoothed image $Z_0$ 216 including a corresponding patch $z_0$ 220 within a local neighborhood 218. A patch search 222 is performed. A frequency band transfer 224 is performed to generate a deblurring output L 226 including a result patch $l_i$ 230. A re-initialization 228 is performed to use deblurring output L 226 as blurred input image 204 for a second iteration of process 200.

Figure 3:
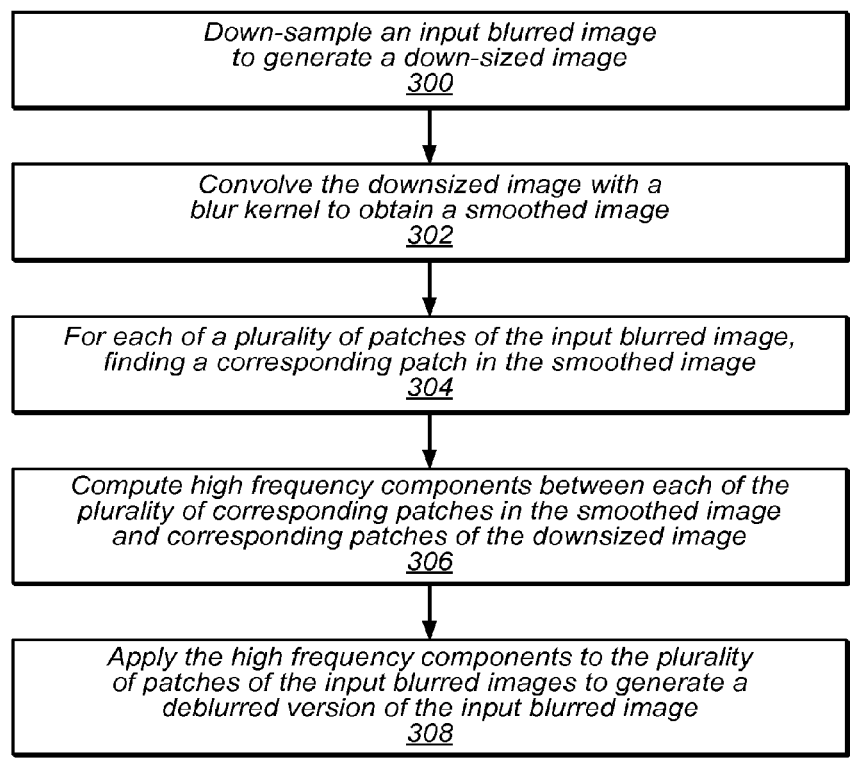
FIG. 3 is a high level logical flowchart for implementing image deblurring and sharpening using local patch self-similarity according to some embodiments.

FIG. 3 is a high level logical flowchart for implementing image deblurring and sharpening using local patch self-similarity according to some embodiments. An input blurred image is down-sampled to generate a downsized image (block 300). In some embodiments, down-sampling of an image is the elimination of image frequencies higher than half the sampling frequency in the result image, which is called a smoothed image. Frequencies thus eliminated are called high-frequency components. The downsized image is convolved with a blur kernel to obtain a smoothed image (block 302). In some embodiments, blur kernel is a mathematical representation used in the blurring of an image or representing the blurring that occurred in an image. A Gaussian blur is the result of blurring an image using a normalized two-dimensional blur kernel called a Gaussian blur kernel. Convolution is the integral of the product of the two functions after one is reversed and shifted. The convolution of f and g is written f*g, using an asterisk or star. It is a particular kind of integral transform of the form:

$$(f*g)(t) \overset{def}{=} \int_{-\infty}^{\infty} f(\tau)g(t-\tau)d\tau.$$

For each of a plurality of patches of the input blurred image, a corresponding patch in the smoothed image is found (block 304). High frequency components between each of the plurality of corresponding patches in the smoothed image and corresponding patches of the downsized image are computed (block 306). The high frequency components are applied to the plurality of patches of the input blurred images to generate a deblurred version of the input blurred image (block 308).

Figure 4:
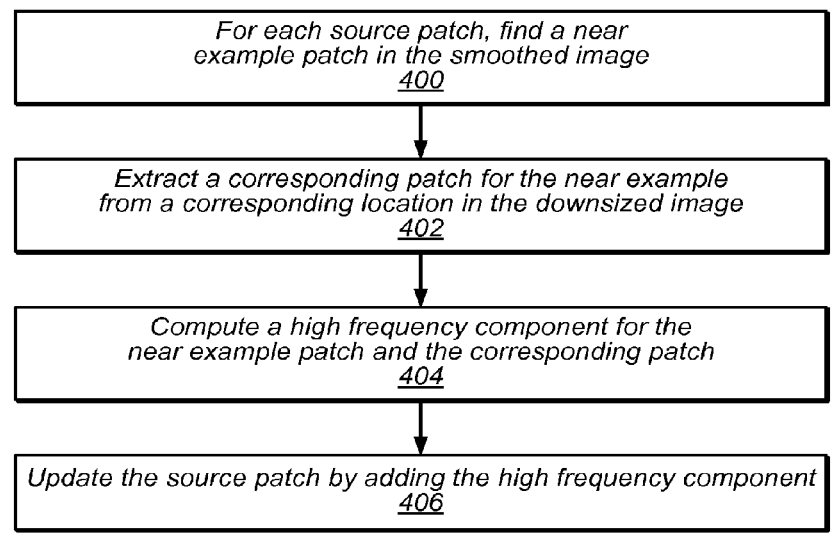
FIG. 4 is a high level logical flowchart of operations that may be used in implementing image deblurring and sharpening using local patch self-similarity according to some embodiments.

FIG. 4 is a high level logical flowchart of operations that may be used in implementing image deblurring and sharpening using local patch self-similarity according to some embodiments. A near example patch in the smoothed image is found (block 400). A corresponding patch for the near example is extracted from a corresponding location in the downsized image (block 402). A high frequency component between the near example patch and the corresponding patch is computed (block 404). The source patch is updated by adding the high frequency component to it. (block 406).

Figure 5:
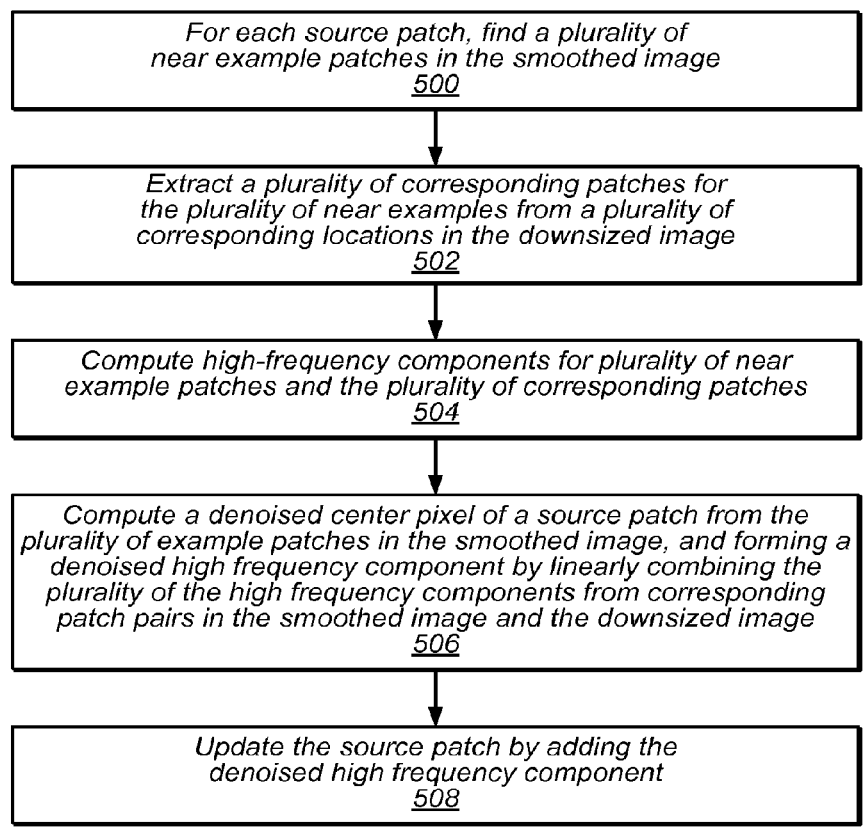
FIG. 5 is a high level logical flowchart of operations that may be used in implementing image deblurring and sharpening using local patch self-similarity according to some embodiments.
Figure 6A:
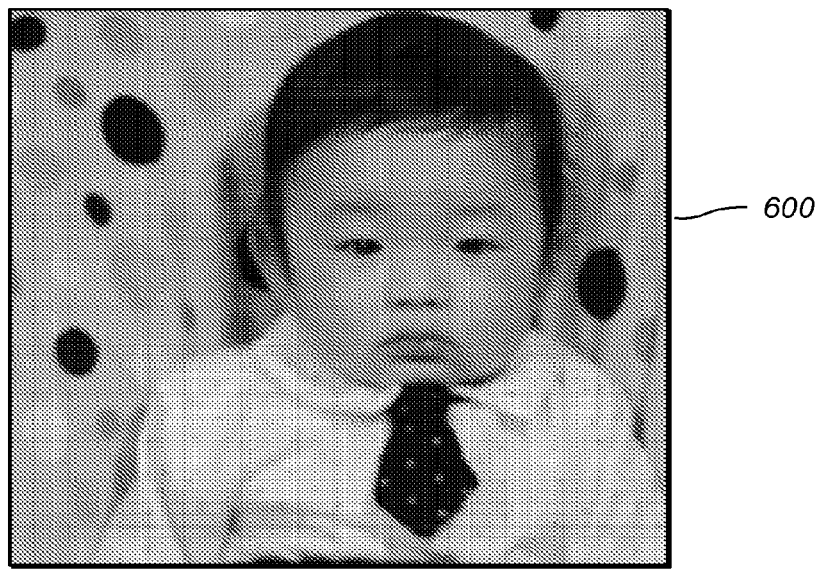
FIG. 6A shows an original image for use in comparisons of one embodiment to previous sharpening methods.

FIG. 5 is a high level logical flowchart of operations that may be used in implementing image deblurring and sharpening using local patch self-similarity according to some embodiments. A plurality of near example patches is found in the smoothed image (block 500). A plurality of corresponding patches for the plurality of near examples is extracted from a plurality of corresponding locations in the downsized image (block 502). A high-frequency component is computed for the plurality of near example patches and the plurality of corresponding patches (block 504). A denoised center pixel of a source patch for the each of the corresponding locations in the downsized image is computed (block 506). A denoised high-frequency component is computed by linearly combining the plurality of the high frequency components from corresponding patch pairs in the smoothed image and the downsized image. A source patch is updated by adding the denoised high frequency component. (block 508).

FIG. 6A shows an original image for use in comparisons of one embodiment to previous sharpening methods. An input image 600 is shown.

Figure 6B:
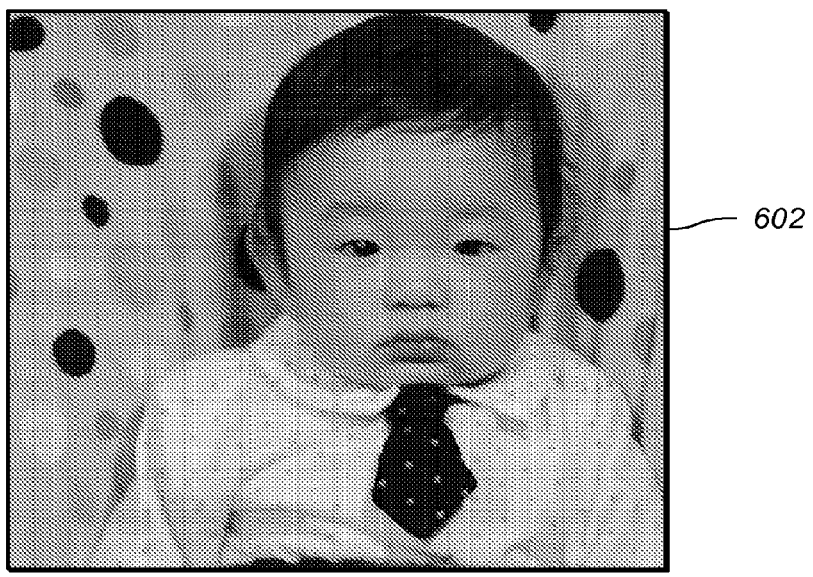
FIG. 6B shows a result of one embodiment.

FIG. 6B shows a result of one embodiment. A result of one embodiment 602 is shown.

Figure 7A:
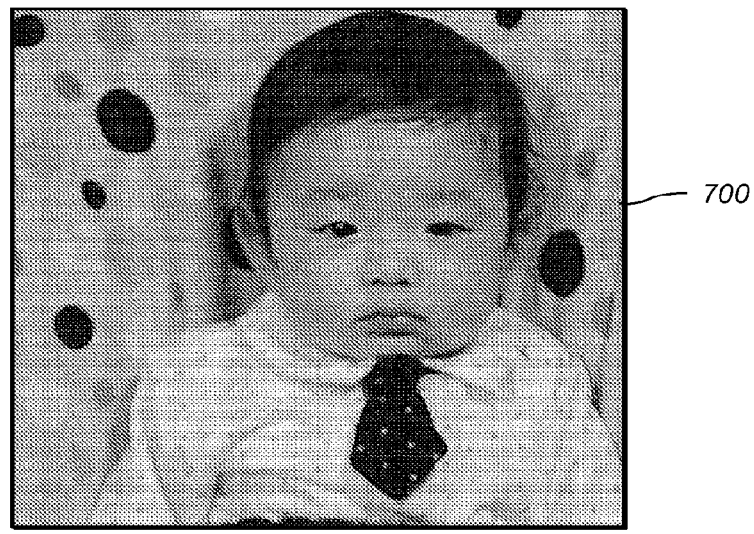
FIG. 7A shows an a result of previous sharpening methods.

FIG. 7A shows a result of previous sharpening methods. A result 700 of a "sharpen more" feature in Adobe™ Photoshop™ from Adobe Systems, Inc of San Jose, Calif. is shown.

Figure 7B:
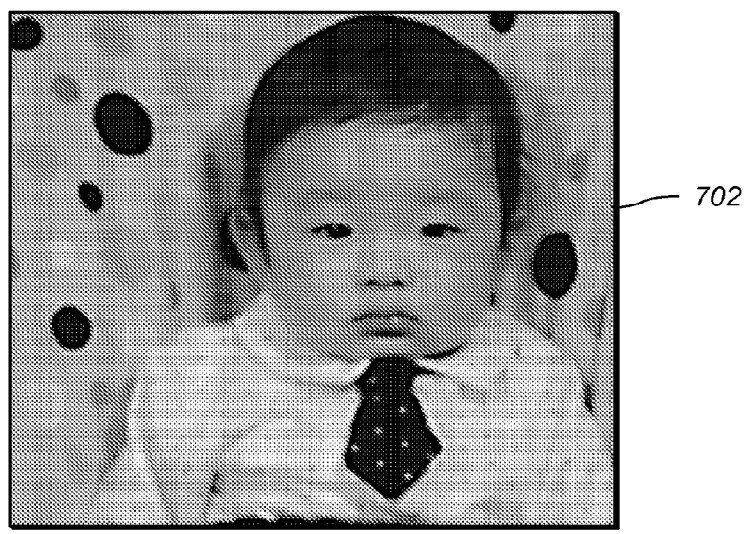
FIG. 7B shows a result of previous sharpening methods.

FIG. 7B shows a result of previous sharpening methods. A result 702 of a "unsharp mask" feature in Adobe™ Photoshop™ from Adobe Systems, Inc. of San Jose, Calif. is shown.

Figure 8A:
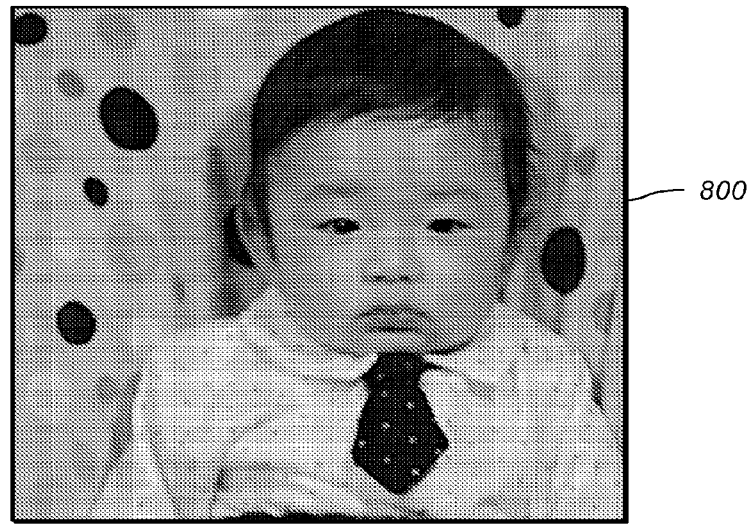
FIG. 8A shows a result of previous sharpening methods.

FIG. 8A shows a result of previous sharpening methods. A result 800 of a "smart sharpen" feature in Adobe™ Photoshop™ from Adobe Systems, Inc. of San Jose, Calif. is shown.

Figure 8B:
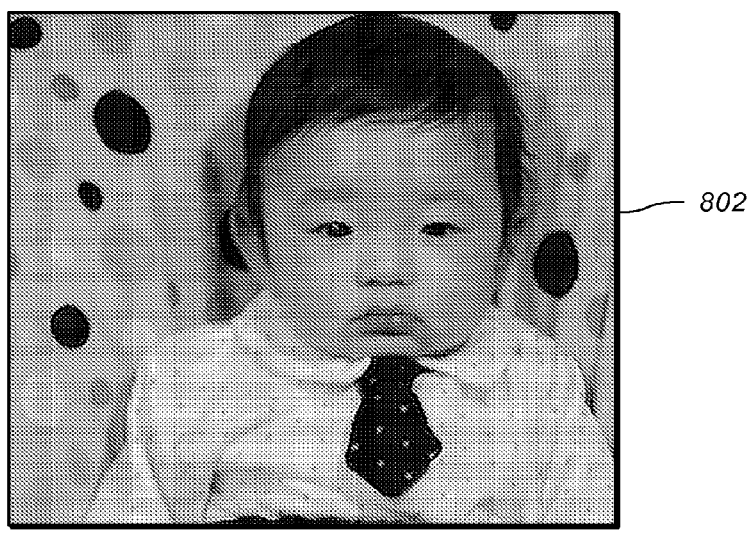
FIG. 8B shows a result of previous sharpening methods.

FIG. 8B shows a result of previous sharpening methods. A result 800 of the Shan sharpening method is shown.

Figure 9A:
FIG. 9A shows an original image for use in comparisons of one embodiment to previous sharpening methods.
Figure 9B:
FIG. 9B shows a result of one embodiment.

FIG. 9A shows an original image for use in comparisons of one embodiment to previous sharpening methods. An input image 900 is shown.

FIG. 9B shows a result of one embodiment. A result of one embodiment 902 is shown.

Figure 9C:
FIG. 9C shows a result of previous sharpening methods.

FIG. 9C shows a result of previous sharpening methods. A result of the Shan method 904 is shown.

Figure 10A:
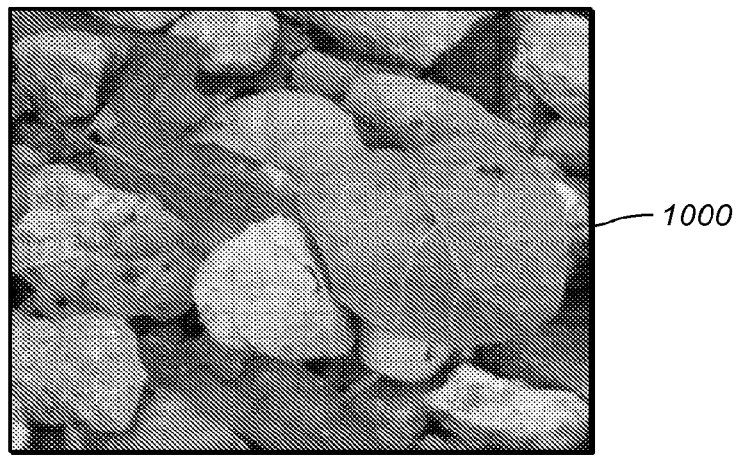
FIG. 10A shows an original image for use in comparisons of one embodiment to previous sharpening methods.

FIG. 10A shows an original image for use in comparisons of one embodiment to previous sharpening methods. An input image 1000 is shown.

Figure 10B:
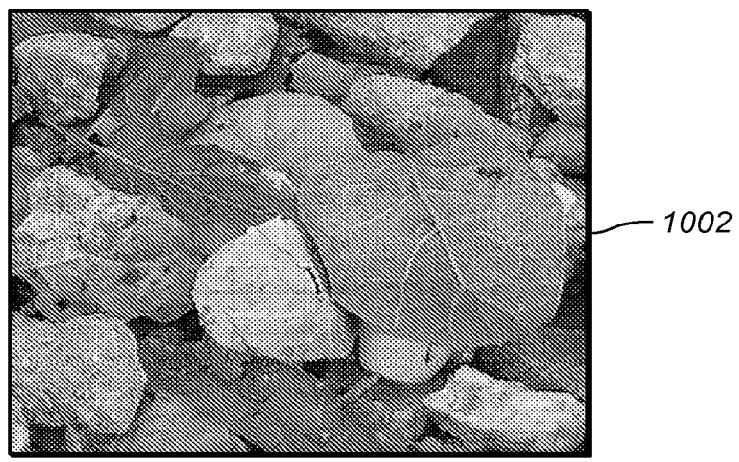
FIG. 10B shows a result of one embodiment.

FIG. 10B shows a result of one embodiment. A result of one embodiment 1002 is shown.

Figure 10C:
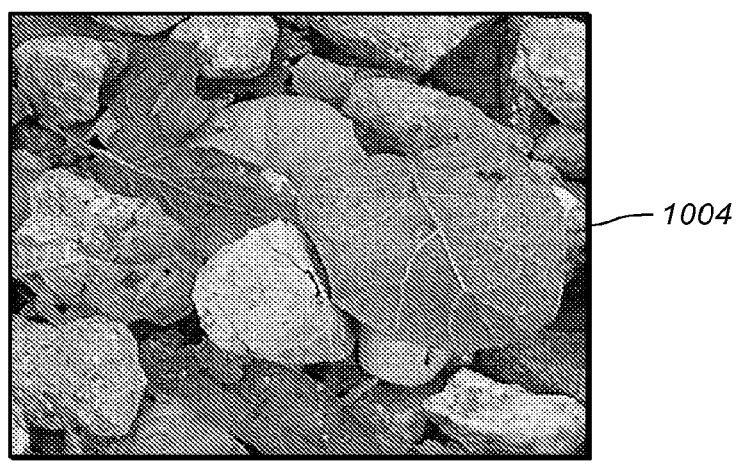
FIG. 10C shows a result of previous sharpening methods.

FIG. 10C shows a result of previous sharpening methods. A result of the Cho & Lee method 1004 is shown.

Figure 11A:
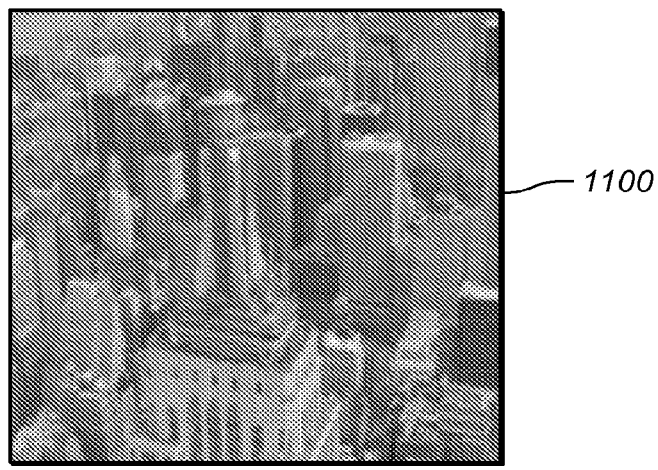
FIG. 11A shows an original image for use in comparisons of one embodiment to previous upscaling methods.
Figure 11B:
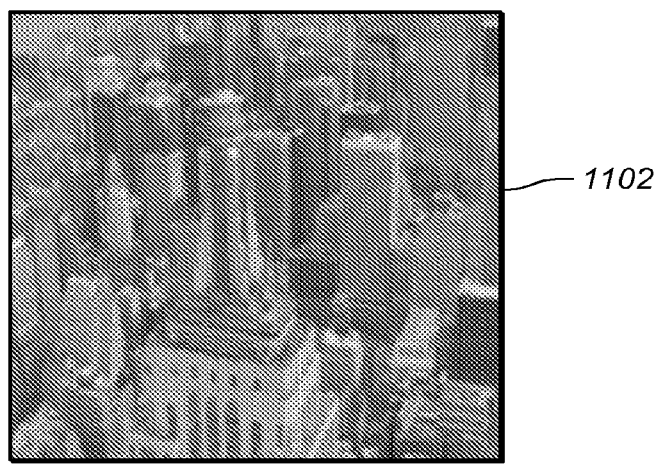
FIG. 11B shows a result of previous upscaling methods.
Figure 11C:
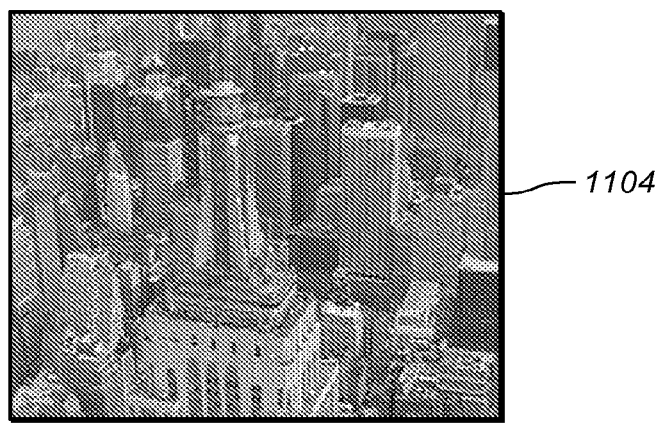
FIG. 11C shows a result of one embodiment.

Additionally, embodiments of the deblurring/sharpening methods described herein support image super-resolution by deblurring the bicubic-interpolated upscaled images as follows. Given an input low-res image I and a scale factor s, some embodiments (1) upsample I with the scale factor s using bicubic interpolation or other sophisticated upsampling methods such as the Lanczos filter, (2) execute the deblurring algorithms (Algorithm 1 or 2) described herein using the default 2D Gaussian elementary kernel with the number of iteration set to N=⌊1.5s⌋. FIGS. 11A-11C show an example super-resolution result, and comparison with bicubic interpolation. As can be seen, some embodiments provide a super-resolution result is much cleaner and sharper than the baseline bicubic interpolation.

FIG. 11A shows an original image for use in comparisons of one embodiment to previous upscaling methods. An input image 1100 is shown.

FIG. 11B shows a result of previous upscaling methods. A result of bicubic interpolation is shown.

FIG. 11C shows a result of one embodiment. A result of one embodiment 1104 is shown.

Example System

Figure 12:
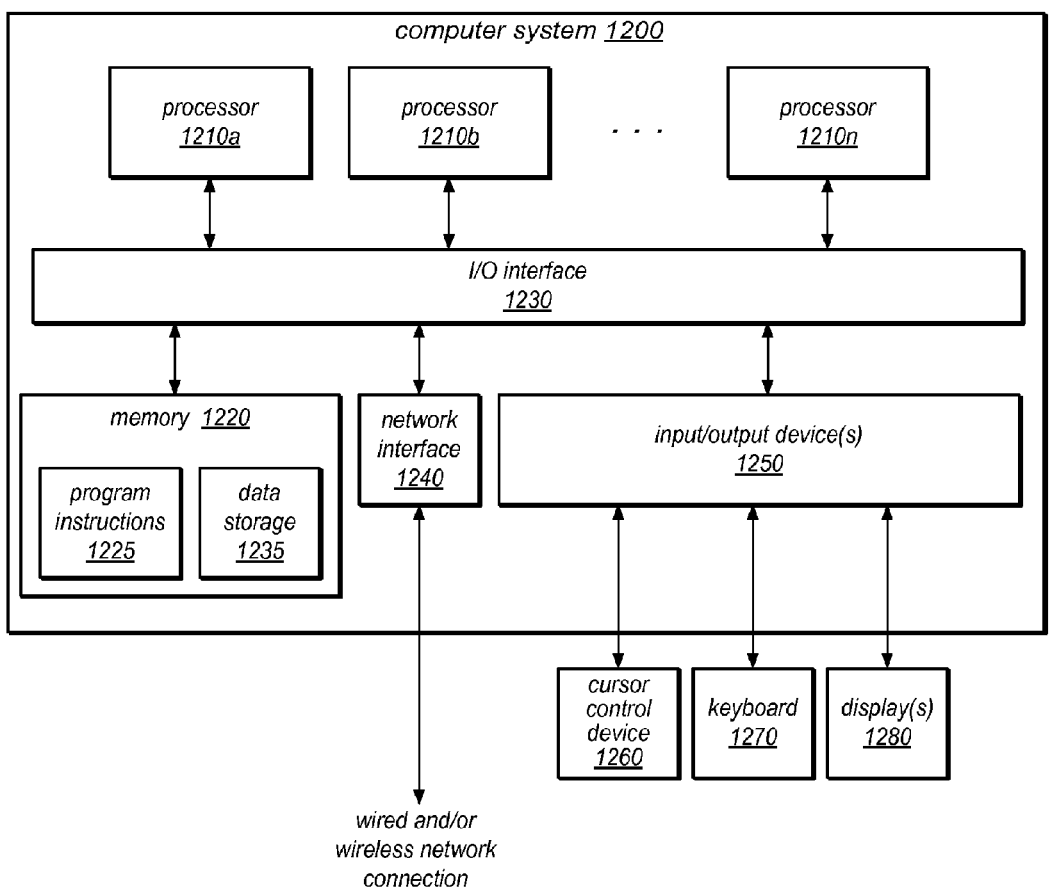
FIG. 12 illustrates an example computer system that may be used in embodiments.

Embodiments of a deblurring and sharpening module and/ or of the various deblurring and sharpening image editing techniques as described herein may be executed on one or more computer systems, which may interact with various other devices. One such computer system is illustrated by FIG. 12. In different embodiments, computer system 1200 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1200 includes one or more processors 1210 coupled to a system memory 1220 via an input/output (I/O) interface 1230. Computer system 1200 further includes a network interface 1240 coupled to I/O interface 1230, and one or more input/output devices 1250, such as cursor control device 1260, keyboard 1270, and display(s) 1280. In some embodiments, it is contemplated that embodiments may be implemented using a single instance of computer system 1200, while in other embodiments multiple such systems, or multiple nodes making up computer system 1200, may be configured to host different portions or instances of embodiments. For example, in one embodiment some elements may be implemented via one or more nodes of computer system 1200 that are distinct from those nodes implementing other elements.

In various embodiments, computer system 1200 may be a uniprocessor system including one processor 1210, or a multiprocessor system including several processors 1210 (e.g., two, four, eight, or another suitable number). Processors 1210 may be any suitable processor capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA.

In some embodiments, at least one processor 1210 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1220 may be configured to store program instructions and/or data accessible by processor 1210. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a gesture-based image editing module are shown stored within system memory 1220 as program instructions 1225 and data storage 1235, respectively. In other embodiments, program instructions and/or data may be received, sent or stored upon different types of computer-accessible media or on similar media separate from system memory 1220 or computer system 1200. Generally speaking, a computer-accessible medium may include storage media or memory media such as magnetic or optical media, e.g., disk or CD/DVD-ROM coupled to computer system 1200 via I/O interface 1230. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1240.

In one embodiment, I/O interface 1230 may be configured to coordinate I/O traffic between processor 1210, system memory 1220, and any peripheral devices in the device, including network interface 1240 or other peripheral interfaces, such as input/output devices 1250. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. In addition, in some embodiments some or all of the functionality of I/O interface 1230, such as an interface to system memory 1220, may be incorporated directly into processor 1210.

Network interface 1240 may be configured to allow data to be exchanged between computer system 1200 and other devices attached to a network, such as other computer systems, or between nodes of computer system 1200. In various embodiments, network interface 1240 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1250 may, in some embodiments, include one or more display terminals, keyboards, keypads, touchpads, scanning devices, voice or optical recognition devices, or any other devices suitable for entering or retrieving data by one or more computer system 1200. Multiple input/output devices 1250 may be present in computer system 1200 or may be distributed on various nodes of computer system 1200. In some embodiments, similar input/output devices may be separate from computer system 1200 and may interact with one or more nodes of computer system 1200 through a wired or wireless connection, such as over network interface 1240.

As shown in FIG. 12, memory 1220 may include program instructions 1225, configured to implement embodiments of a deblurring and sharpening module as described herein, and data storage 1235, comprising various data accessible by program instructions 1225. In one embodiment, program instructions 1225 may include software elements of embodiments of a deblurring and sharpening image editing module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a deblurring and sharpening image editing module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1200 may be transmitted to computer system 1200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:
1. A method, comprising:
using one or more processors to perform
down-sampling an input blurred image to generate a downsized image;
convolving the downsized image with a blur kernel to obtain a smoothed image;
for each of a plurality of patches of the input blurred image, finding a corresponding patch in the smoothed image;
computing high frequency components between each of the plurality of corresponding patches in the smoothed image and corresponding patches of the downsized image; and
applying the high frequency components to the plurality of patches of the input blurred images to generate a deblurred version of the input blurred image.

2. The method of claim 1, further comprising:
for each source patch, finding a near example patch in the smoothed image,
extracting a corresponding patch for the near example from a corresponding location in the downsized image,
computing a high frequency component for the near example patch and the corresponding patch, and
adding the high frequency component to update the source patch.

3. The method of claim 2, wherein the finding a near example patch in the smoothed image further comprises finding a nearest example patch in terms of a Euclidian distance around a mapping location.

4. The method of claim 1, further comprising:
finding a plurality of near example patches in the smoothed image, extracting a plurality of corresponding patches for the plurality of near examples from a plurality of corresponding locations in the downsized image, computing high-frequency components for the plurality of near example patches and the plurality of corresponding patches, computing a denoised center pixel of a source patch from the plurality of example patches in the smoothed image, forming a denoised high frequency component by linearly combining the plurality of the high frequency components from corresponding patch pairs in the smoothed image and the downsized image, and updating the source patch by adding the denoised high frequency component.

5. The method of claim 1, wherein the convolving the downsized image with the elementary blur kernel further comprises convolving the downsized image with the elementary blur kernel with the size of the elementary blur kernel proportional to a scale factor.

6. The method of claim 1, further comprising:
converting the input blurred image from a color channel space to a luminance and chrominance space; and
executing the generating, obtaining, computing and estimating with respect to a luminance channel of the luminance and chrominance space.

7. The method of claim 1, further comprising:
iterating the generating, obtaining, computing and estimating with respect to the deblurred output.

8. A system, comprising:
at least one processor; and
a memory comprising program instructions, wherein the program instructions are executable by the at least one processor to:
 down-sample an input blurred image to generate a downsized image;
 convolve the downsized image with a blur kernel to obtain a smoothed image;
 for each of a plurality of patches of the input blurred image, find a corresponding patch in the smoothed image;
 compute high frequency components between each of the plurality of corresponding patches in the smoothed image and corresponding patches of the downsized image; and
 apply the high frequency components to the plurality of patches of the input blurred images to generate a deblurred version of the input blurred image.

9. The system of claim 8, further comprising program instructions executable by the at least one processor to:
 for each source patch, find a near example patch in the smoothed image,
 extract a corresponding patch for the near example from a corresponding location in the downsized image,
 compute a high frequency component for the near example patch and the corresponding patch, and
 add the high frequency component to update the source patch.

10. The system of claim 9, wherein the program instructions executable by the at least one processor to find a near example patch in the smoothed image further comprise program instructions executable by the at least one processor to find a nearest example patch in terms of a Euclidian distance around a mapping location.

11. The system of claim 8, further comprising program instructions executable by the at least one processor to:
 for each source patch, find a plurality of near example patches in the smoothed image,
 extract a plurality of corresponding patches for the plurality of near examples from a plurality of corresponding locations in the downsized image,
 compute high-frequency components for the plurality of near example patches and the plurality of corresponding patches,
 compute a denoised center pixel of a source patch from the plurality of example patches in the smoothed image,
 form a denoised high frequency component by linearly combining the plurality of the high frequency components from corresponding patch pairs in the smoothed image and the downsized image, and
 update the source patch by adding the denoised high frequency component.

12. The system of claim 8, wherein the program instructions executable by the at least one processor to convolve the downsized image with the elementary blur kernel further comprise program instructions executable by the at least one processor to convolve the downsized image with the elementary blur kernel with the size of the elementary blur kernel proportional to a scale factor.

13. The system of claim 8, further comprising program instructions executable by the at least one processor to:
 convert the input blurred image from a color channel space to a luminance and chrominance space; and
 execute the program instructions executable by the at least one processor to generate, obtain, compute and estimate with respect to a luminance channel of the luminance and chrominance space.

14. The system of claim 8, further comprising:
 iterate execution of the program instructions executable by the at least one processor to generate, obtain, compute and estimate with respect to the deblurred output.

15. A non-transient computer-readable storage medium storing program instructions, wherein the program instructions are computer-executable to implement:
 down-sampling an input blurred image to generate a downsized image;
 convolving the downsized image with a blur kernel to obtain a smoothed image;
 for each of a plurality of patches of the input blurred image, finding a corresponding patch in the smoothed image;
 computing high frequency components between each of the plurality of corresponding patches in the smoothed image and corresponding patches of the downsized image; and
 applying the high frequency components to the plurality of patches of the input blurred images to generate a deblurred version of the input blurred image.

16. The non-transient computer-readable storage medium of claim 15, further comprising program instructions computer-executable to implement:
 for each source patch, find a near example patch in the smoothed image,
 extracting a corresponding patch for the near example from a corresponding location in the downsized image,
 computing a high frequency component for the near example patch and the corresponding patch, and
 adding the high frequency component to update the source patch.

17. The non-transient computer-readable storage medium of claim 16, wherein the program instructions computer-executable to implement finding a near example patch in the smoothed image further comprise program instructions computer-executable to implement finding a nearest example patch in terms of a Euclidian distance around a mapping location.

18. The non-transient computer-readable storage medium of claim 15, further comprising program instructions computer-executable to implement:
- for each source patch, finding a plurality of near example patches in the smoothed image,
- extracting a plurality of corresponding patches for the plurality of near examples from a plurality of corresponding locations in the downsized image,
- computing high-frequency components for the plurality of near example patches and the plurality of corresponding patches,
- computing a denoised center pixel of a source patch from the plurality of example patches in the smoothed image,
- forming a denoised high frequency component by linearly combining the plurality of the high frequency components from corresponding patch pairs in the smoothed image and the downsized image, and
- updating the source patch by adding the denoised high frequency component.

19. The non-transient computer-readable storage medium of claim 15, wherein the program instructions computer-executable to implement convolving the downsized image with the elementary blur kernel further comprises convolving the downsized image with the elementary blur kernel with the size of the elementary blur kernel proportional to a scale factor.

20. The non-transient computer-readable storage medium of claim 15, further comprising program instructions computer-executable to implement:
- converting the input blurred image from a color channel space to a luminance and chrominance space; and
- executing the generating, obtaining, computing and estimating with respect to a luminance channel of the luminance and chrominance space.

* * * * *